United States Patent [19]

Derrien

[11] 4,084,482
[45] Apr. 18, 1978

[54] MACHINE TOOLS HAVING A ROTATING SPINDLE SUCH AS MILLING MACHINES

[75] Inventor: Robert F. Derrien, Montgeron, France

[73] Assignee: Societe Hure S A, Bagneux, France

[21] Appl. No.: 667,364

[22] Filed: Mar. 16, 1976

[30] Foreign Application Priority Data

Mar. 21, 1975 France .............................. 75 08869
Jul. 9, 1975 France .............................. 75 21517

[51] Int. Cl.² .......................... B23C 9/00; B23Q 5/22
[52] U.S. Cl. ............................. 90/11 R; 74/384;
74/572; 74/785; 74/798; 90/11 A
[58] Field of Search .................. 90/11 R, 11 A, 1 R;
74/206, 384, 572, 574, 785, 788, 798

[56] References Cited

U.S. PATENT DOCUMENTS

| 1,374,460 | 4/1921 | Ljungstrom ................. 90/11 A |
| 2,331,684 | 10/1943 | Henningsen ................. 74/785 |
| 2,432,383 | 12/1947 | Colwell ................. 90/11 A |
| 3,167,999 | 2/1965 | Montean, Jr. ................. 74/574 X |

*Primary Examiner*—Z. R. Bilinsky
*Attorney, Agent, or Firm*—Darby & Darby

[57] ABSTRACT

A machine tool comprising a rotatable spindle, at least one fly-wheel, at least one first roller carried by the spindle and at least one further roller for driving the fly-wheel, wherein the at least one further roller can be engaged with and disengaged from the at least one first roller, so that the fly-wheel can be optionally rotated with the spindle without any play.

10 Claims, 11 Drawing Figures

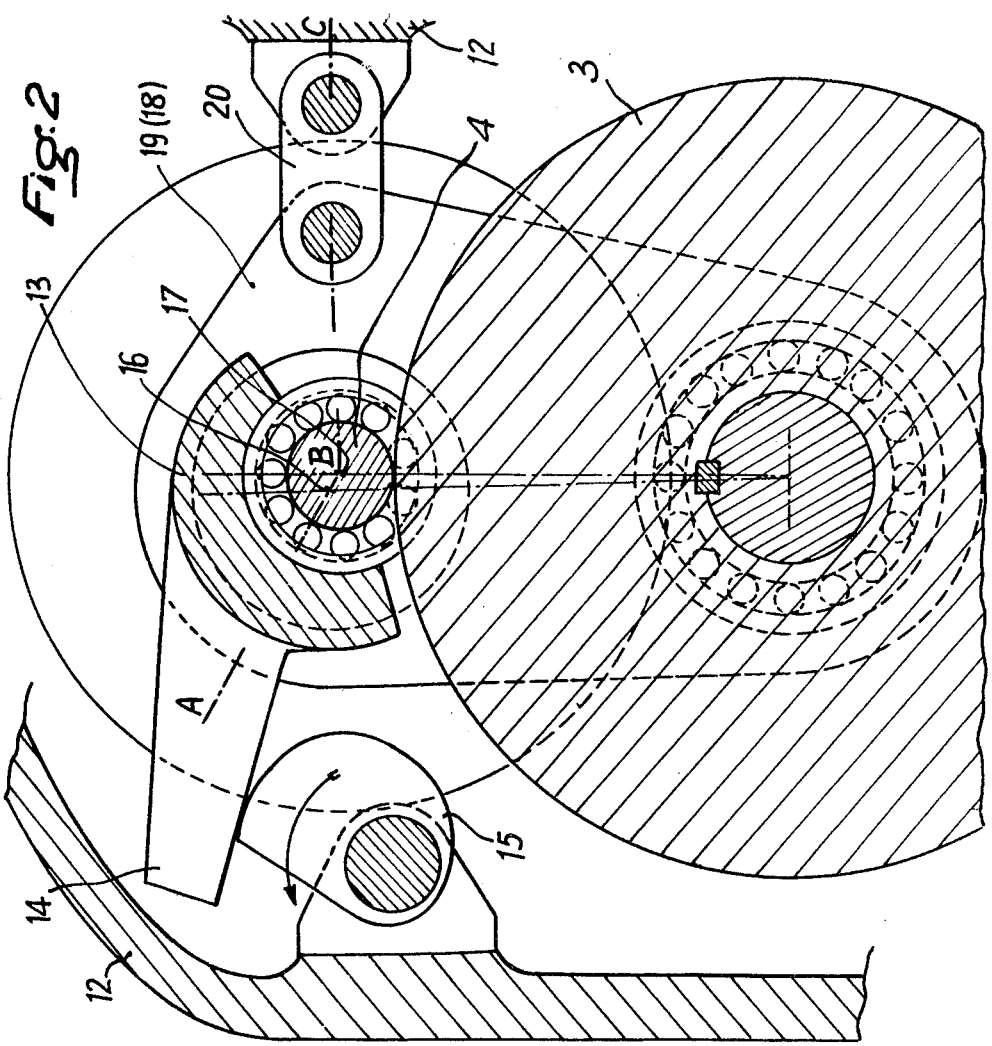
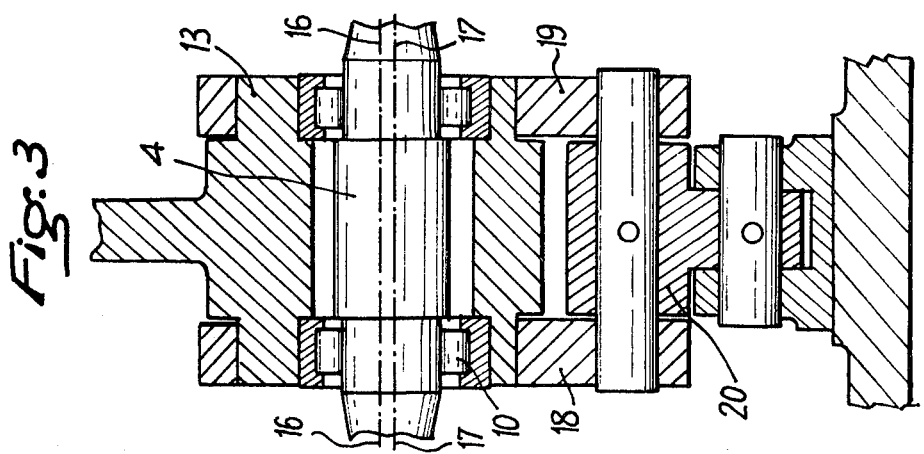

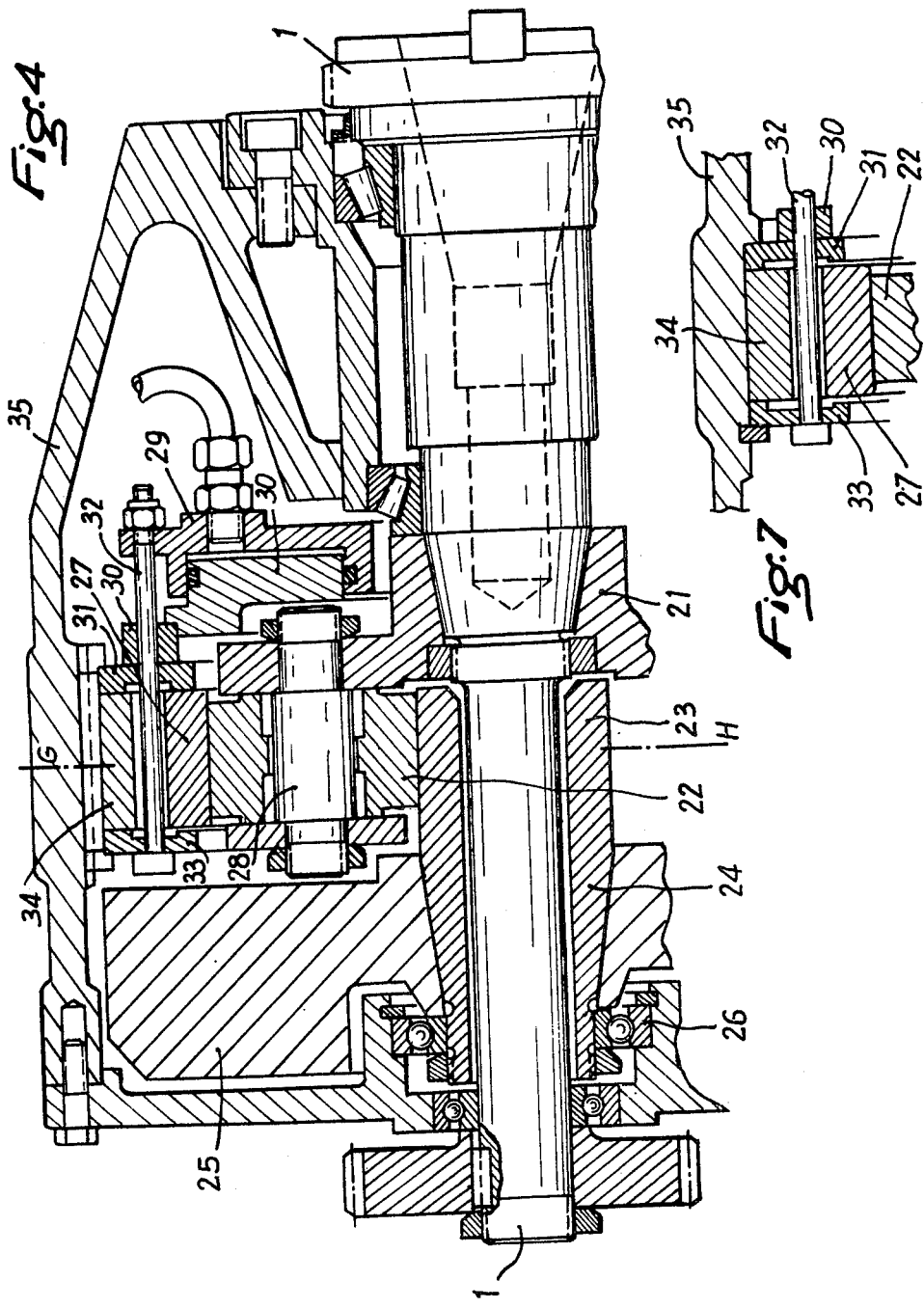

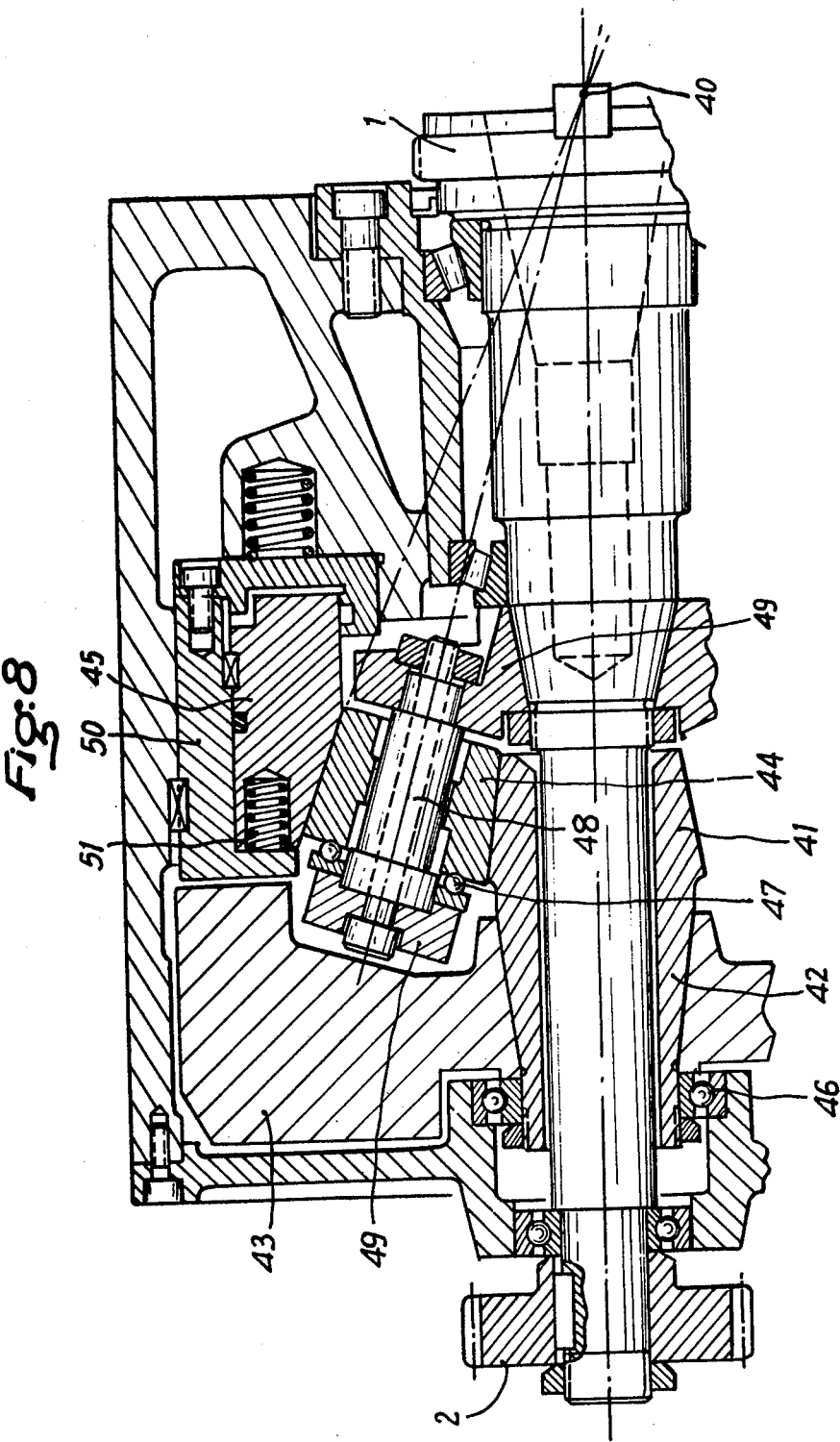

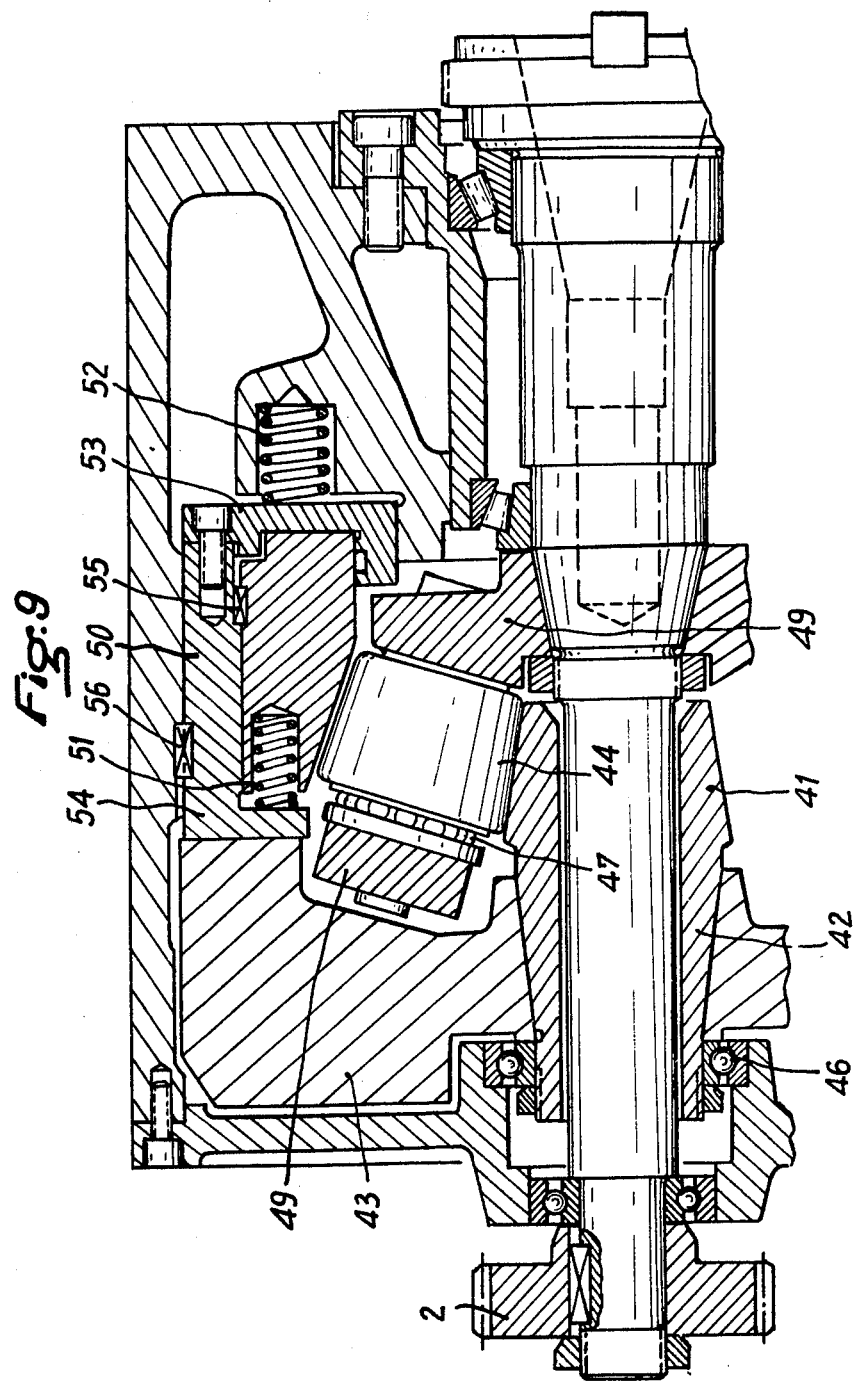

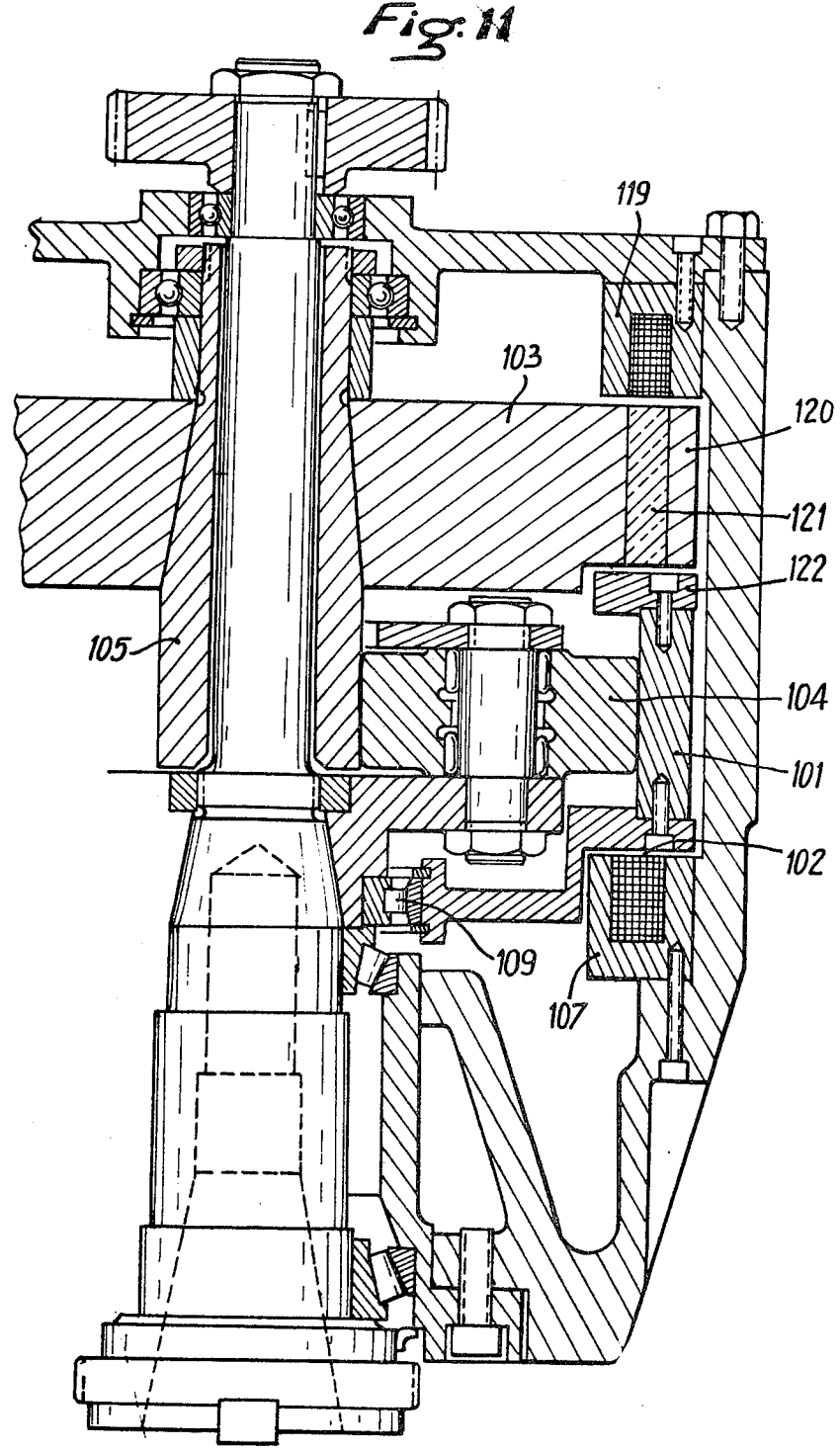

MACHINE TOOLS HAVING A ROTATING SPINDLE SUCH AS MILLING MACHINES

BACKGROUND OF THE INVENTION

1. Field of the Invention

This invention relates to machine tools having a rotating spindle, for example milling machines.

2. Description of the Prior Art

In machine tools having a rotating spindle the cutting stress may be reduced suddenly from a high value to zero, then resume its initial value just as suddenly. This happens in particular when working on a surface to be dressed by one of its edges, as is inevitable at the beginning of each pass; the same phenomenon is found when working with straight-toothed or slightly spiral-fluted cutters as with cutters of so-called constant profile form in which one tooth attacks the material each time with its entire width.

This phenomenon, termed interrupted cutting, makes the gear wheels of the kinematic chain clatter in their play, which produces an unpleasant noise and tends to cause the cutting edges of the tools to break at the moment of attack; they are immobilised for a time, even an extremely short time, and then receive something like a hammer blow when the play in the kinematic chain is violently taken up.

It is known that a fly-wheel arranged on the spindle of the machine or on a shaft located upstream and connected without play to the said spindle provides an effective remedy for this disadvantage.

However for such a fly-wheel to be effective it must be very large and in fact it is often mounted on the rear part of the spindle and in the open air; this arrangement excludes its use on universal cutters in which the spindle must be capable of orientation in every direction. For the same reason of effectiveness it is sometimes located on a control shaft rotating faster than the spindle. The transmission to the latter must then be without appreciable play. In addition, if the fly-wheel is useful for cutters of relatively large diameter, for which the spindle rotates slowly, it may be harmful and even dangerous when the spindle rotates rapidly. The energy necessary to bring it up to speed is then too great as is that lost to bring it to a standstill; moreover, for reasons of safety it must be possible to immobilise a spindle virtually instantaneously in the event of an accident.

SUMMARY OF THE INVENTION

With the aim of removing these disadvantages, the present invention relates to an improvement in machine tools having a rotating spindle, comprising at least one fly-wheel driven by at least one roller rolling on at least one roller borne by the spindle, means being provided to subject to pressure or disengage the said drive by means of rollers rolling one upon the other.

Thus by suitable selection of the diameters of the various rollers it is possible to arrange a fly-wheel rotating at a speed several times greater than that of the spindle with a transmission which is totally free of play, and with the possibility of disengaging the fly-wheel when its effect is no longer useful or even dangerous; in addition the kinetic energy coupled to the spindle may assume two values, one very great when the fly-wheel is driven and the other negligible when the fly-wheel is not driven.

The invention also relates to the following arrangements:

(a) The fly-wheel is mounted on a shaft which carries a roller which rolls on a roller mounted without play or integral with the spindle and this shaft is mounted in the casing of the machine by means of bearings fitted in an eccentric bush rotatable by a cam, which permits the rollers to be placed under pressure against one another or to be disengaged.

(b) The eccentric bush may be mounted in connecting side-members located on either side of the rollers and surrounding their bearings, the said side-members being connected in articulated manner to the casing of the machine.

(c) The roller to the fly-wheel is driven by means of a train of satellite rollers carried by the spindle shaft and running in a planetary ring, means being provided to brake and immobilise the said planetary ring or on the other hand to allow it to rotate.

(d) The rollers of the fly-wheel, the satellite rollers and the planetary ring have parallel axes and braking is obtained by gripping the sides of the planetary ring between movable flanges or by any other equivalent coupling.

(e) The planetary system is of the type having conical rollers and the planetary ring is immobile in rotation but movable parallel to the axis of the spindle shaft between a coupling position by contact with the satellite and a disengaged position.

(f) The braking and disengagement system is of the hydraulic pressure type.

With the device according to the invention it is also possible to obtain not only two but three possible values for the kinetic energy coupled to the spindle. This may be accomplished by an arrangement in which the fly-wheel is driven by means of a train of satellite rollers rolling without slip in a planetary ring which is capable not only of being left free or immobilised by any appropriate means but also of being made an integral part in rotation with the fly-wheel.

Preferred arrangements include the following:

(g) The means of connecting the fly-wheel and the planetary ring are electromagnetic.

(h) The means of immobilising the planetary ring are electromagnetic.

(i) The planetary ring is mounted about the main shaft and capable of axial movement and it carries a part forming a yoke for a magnetic circuit carried by the fly-wheel, the freedom of axial movement of the planetary ring being sufficient for the said yoke to lie flat against the fly-wheel when the said magnetic circuit is excited.

(j) The planetary ring is mounted about the main shaft and capable of axial movement and it carries a part forming a yoke for a magnetic circuit carried by the fixed casing, the freedom of axial movement of the planetary ring being sufficient for the said yoke to come and lie against the circuit carried by the fixed casing when the circuit is excited.

(k) The planetary ring is mounted about the main shaft and capable of axial movement and it carries on each of its sides a part forming a yoke for on the one hand a magnetic circuit carried by the fly-wheel, and on the other hand a magnetic circuit carried by the fixed casing, the freedom of axial movement of the planetary ring being sufficient so that either one or the other of the said yokes can come and lie against the corresponding magnetic circuit when the latter is excited.

(l) The magnetic circuit carried by the fly-wheel comprises a winding arranged in the fly-wheel and supplied with electric current from the fixed casing by a brush assembly contacting one of the rings carried by the fly-wheel.

(m) the magnetic circuit carried by the fly-wheel comprises a winding carried by the fixed casing and an assembly for conducting the magnetic lines of force forming the fly-wheel and composed of a core, the fly-wheel and an external ring of soft iron separated by a ring of non-magnetic material.

BRIEF DESCRIPTION OF THE DRAWINGS

FIG. 2 is a section on the line E-F of FIG. 1;

FIG. 3 is a section on the line A-B-C of FIG. 2;

FIG. 4 is an axial section of the spindle and of a planetary drive train of the fly-wheel in the engaged position;

FIG. 7 shows a detail of the locking arrangement of the ring in the unlocked position corresponding to the disengaged fly-wheel;

FIG. 8 is an axial section of the spindle and of the planetary drive train of the fly-wheel with conical rollers in the engaged position;

FIG. 9 shows the same planetary train disengaged;

FIG. 11 shows a variant of FIG. 10 in partial axial section.

DESCRIPTION OF THE PREFERRED EMBODIMENTS

Figure 1:
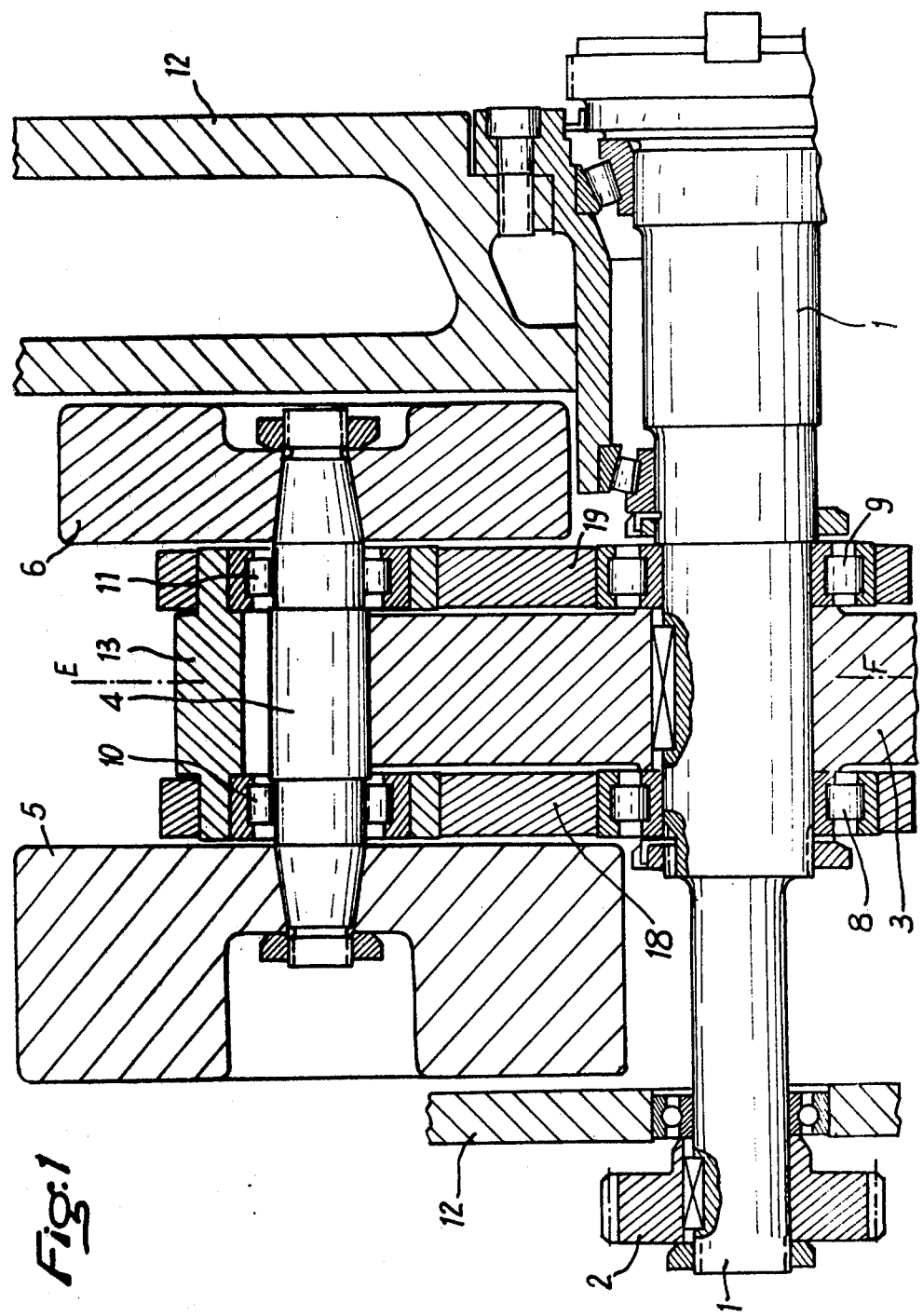
FIG. 1 is an axial section through a portion of a machine tool according to the invention.
Figure 5:
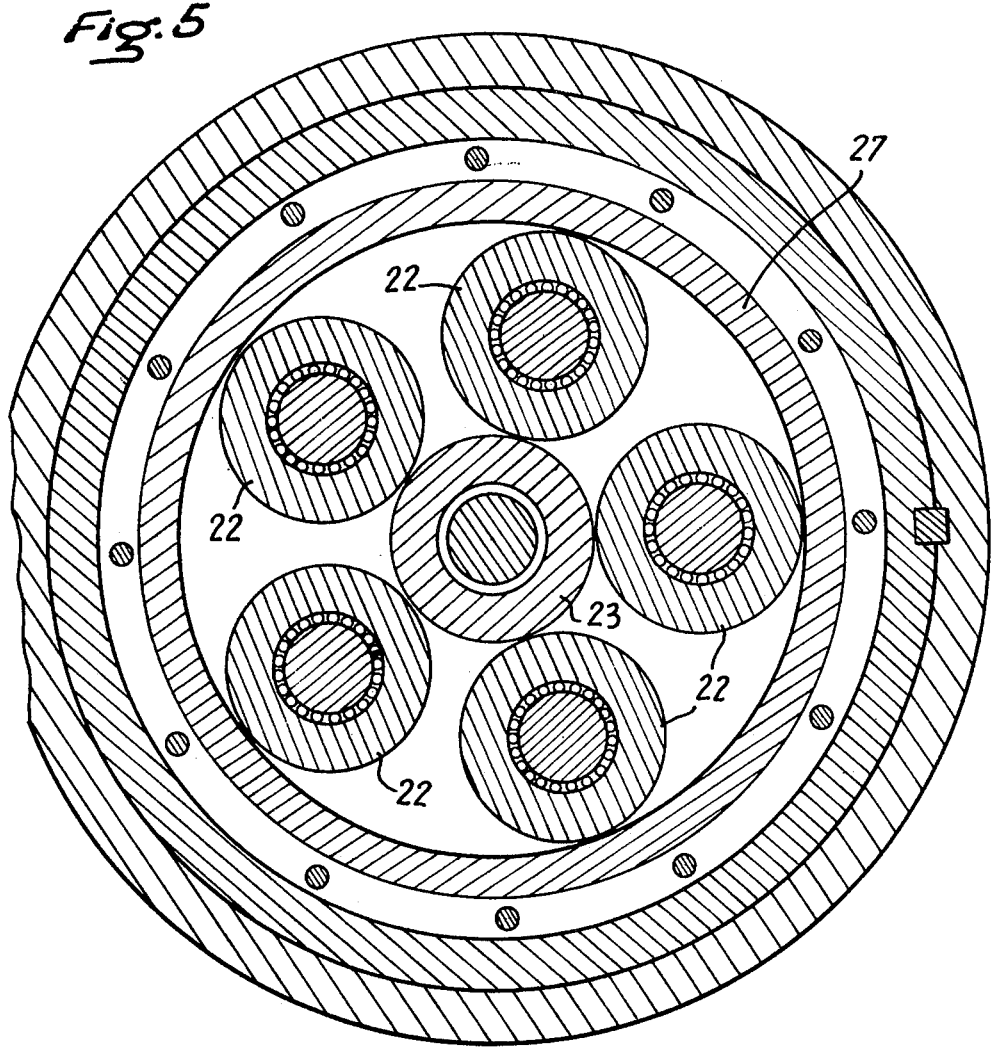
FIG. 5 is a section on the line G-H of FIG. 4.
Figure 6:
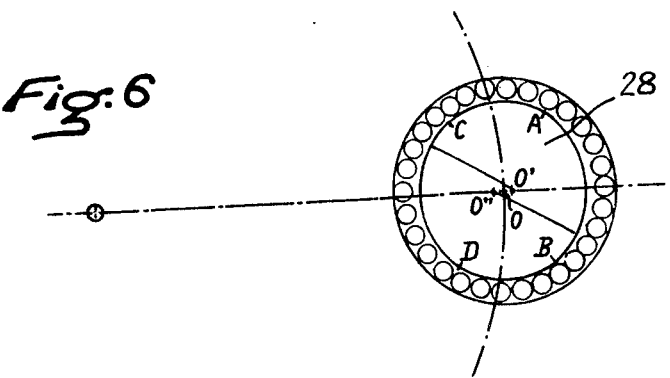
FIG. 6 shows a detail of the bearing of a satellite roller.

On a spindle 1 (FIGS. 1, 2 and 3), driven by gearing 2 there is keyed a large roller 3 which is applied with a large force onto a small roller 4. The roller 4, made in one piece with its axle, is provided at either end with two fly-wheels 5 and 6.

In order to be able to disengage the fly-wheels, the two bearings 10 and 11 are mounted in an eccentric bushing 13 (FIGS. 1, 2 and 3) which carries a lever 14 operated by a cam 15. By causing the cam to rotate in the direction of the arrow (FIG. 2), the eccentric 13 is rotated about the axis of its bearing surfaces 16, and the axis 17 of the small roller and of the fly-wheels then moves away from that of the large roller and of the spindle separating the small roller 4 from the large roller 3.

In order to avoid an excessively large thrust of the roller 3 which might cause the spindle to be deflected and deform its precision bearings, the bearings 8, 9, 10 and 11 are mounted in two connecting side members 18 and 19 which directly support the reaction of the roller 4 on the roller 3. This necessitates an attaching member 20, articulated on 18, 19 and the casing 12.

In order to obtain a better equilibrium of forces on the spindle 1, a variant of the invention has been designed based on the principle of a planetary train (FIGS. 4, 5, 6 and 7). The spindle 1 carries a housing 21 for satellites 22; a central planetary 23 is made from one piece with its tubular axile 24 which carries a fly-wheel 25 and which is supported by a bearing 26, the satellite assembly performing the function of the second bearing. The planetary ring having an internal bearing 27 may be immobilized in order that the planetary train might fulfil its function as step-up drive system between the spindle 1 and the fly-wheel 25; it can also be released to interrupt the said drive: in this case it rotates with the housing 21 of the satellites 22 and the fly-wheel remains immoble or is driven by friction at the speed of the spindle.

In order to obtain a suitable pressure of the satellites 22 on the planetary 23 and on the internal track of the planetary ring 27, the latter is mounted as a collar with a tightness which can be calculated or better still determined experimentally. To avoid any radial reaction on the axle 28 of the satellite, this can be adjusted according to FIG. 6. The distance between the centres 0' and 0" is of the order of 100th of a millimeter for a satellite 50 millimeters in diameter. This produces a slight play in the radial direction of the planetary mechanism while not permitting any play in the tangential direction.

The planetary ring having an internal bearing 27 is immobilized by feeding oil under pressure to an annular hydraulic cylinder 29 under the piston 30; this pushes the circular element 30 into contact with the circular flange 31 while the tie-rods 32 which connect the flange 33 to the cylinder 29 react to this thrust by causing the tightening of the circular flanges 31 and 33 on the internal planetary ring 27. The ring (collar) 34, keyed into the casing 35 serves as a distance piece. The flanges 31 and 33 are conical of the order of 2/10 millimeters; this enables them to behave as elastic collars and to move away as shown in FIG. 7 when the oil pressure on the annular piston 30 is brought to zero. The planetary ring 27 can then rotate freely. This hydraulic system may be replaced by any other means of producing tightening e.g. a thread. It is also possible to use springs housed in the ring 24 so as not to rely on the elasticity of the flanges 31 and 33.

The planetary system having cylindrical rollers can be replaced by a planetary system having frusto-conical rollers according to FIGS. 8 and 9. The point 40, as shown in FIG. 8, is the common apex of the cones of the planetary 41, integral with the tubular shaft 42 and with the fly-wheel 43, with the satellite 44 and the planetary ring having an internal bearing 45. With this arrangement, the oblique contact ball-bearing 46 which can also be a conical roller bearing produces a permanent axial pre-load, so that the frusto-conical satellites 44 are in permanent contact with the planetary 41. The axial thrust on the satellite is supported by the thrust bearing 47. When rolling in the internal track of the planetary ring 45 immobilized in rotation at 55, 56, the satellites 44, driven by their axles 48 integral with the satellite housing 49 mounted on the spindle 1, impart a rapid rotational movement to the planetary 41, to its axle 41 and to the fly-wheel 43. This takes place when pressure is applied to the hydraulic cylinder 50 of which the ring 45 forms the piston.

When the hydraulic pressure on the ring 45 is relaxed, the springs 51 repel the ring, the internal track of which no longer contacts the satellites 44. The spindle 1 and the satellite carrier 49 then rotate about their common axis, the satellites 44 running on the planetary wheel 41 immobile with its axle 42 and the fly-wheel 43. At the same time the springs 52 push the bottom of the hydraulic cylinder 53 and the cyliner 50 so that its face 54 comes into contact with the fly-wheel 43 and immobilizes it.

Figure 10:
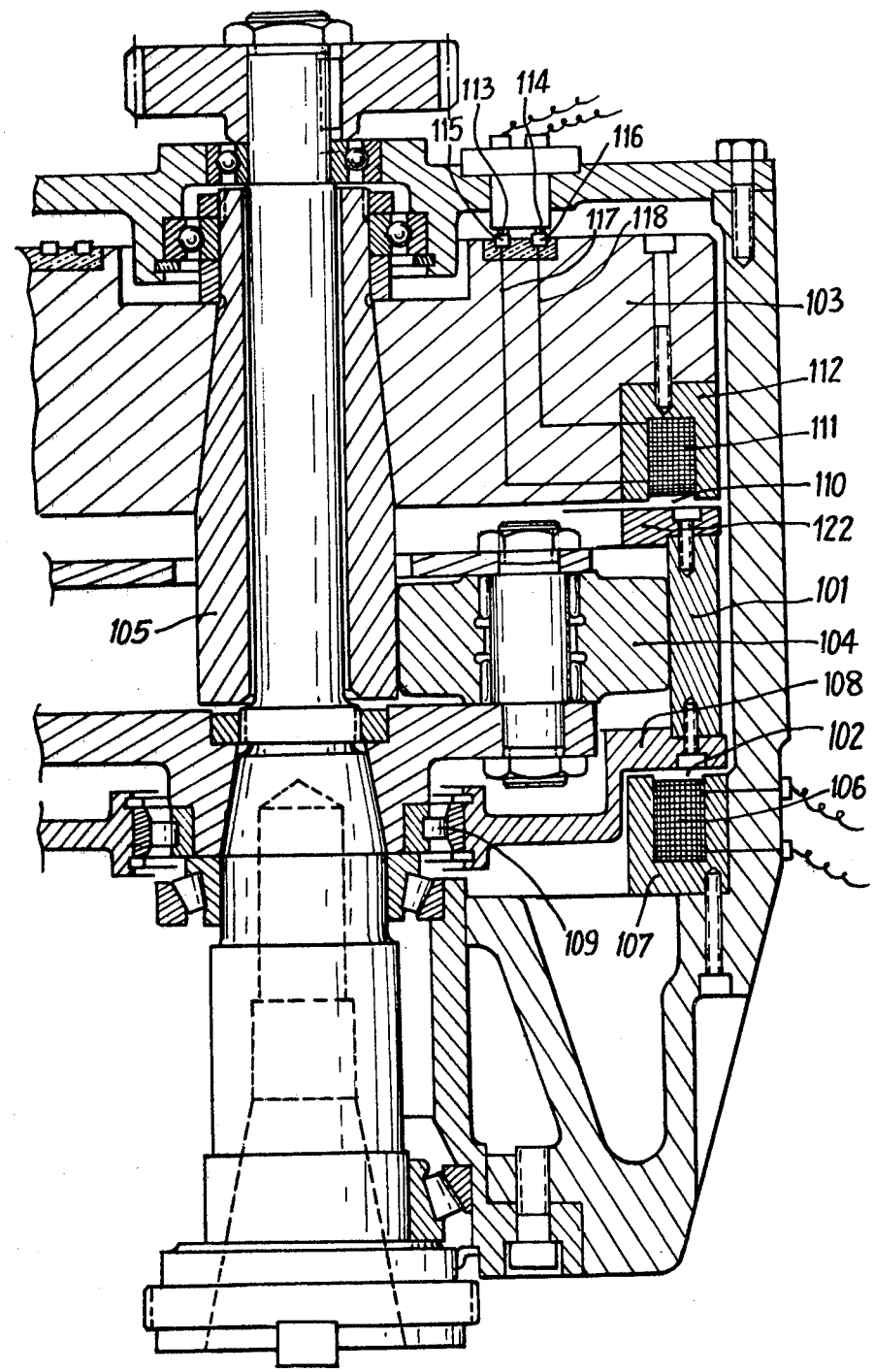
FIG. 10 shows a variant of the invention in partial axial section, this variant giving three kinetic energy values.

In the variant which provides three values for the kinetic energy (FIG. 10), the external ring 101 of the planetary train can be immobilized by an electro-magnetic brake 102. In this case, the fly-wheel 103 is driven by the satellites 104 which cause the planetary 105 to rotate at high speed, the planetary 105 being integral with the fly-wheel 103. The brake is composed of a winding 106 arranged about the principle axis and the magnetic circuit 107 of which the yoke 108 is integral with the ring 101. The ring and the yoke of the magnetic circuit are on the one hand supported by the satellite 104, and on the other hand by the cylindrical roller bearing 109 which permits a slight axial movement. When the electric current passes into the winding 106 the yoke 108 is laid flat on the magnetic circuit 107. The satellites can then perform their function as step-up devices.

The inertia fly-wheel 103 is provided on one side with an electro-magnetic coupling 110 composed of a winding 111 and a magnetic circuit 112 of which the yoke 122 is integral with the ring 101 and placed symmetrically in relation to the yoke 108. This coupling is fed by the brushes 113 and 114 rubbing on the ring 115 and 116 which transmit the current through the conductors 117 and 118 passing into the insulated channels made in the body of the fly-wheel. When the current passes into the electro-magnetic coupling 110, the external ring 101 becomes integral with the fly-wheel and the assembly of the ring 101, satellites 104, planetary 105 acts as a single unit rotating at the speed of the spindle. The kinetic energy of this assembly is substantially lower than that of the fly-wheel rotating at high speed when the ring 101 is immobile.

Finally, when neither the brake, nor the coupling are excited, the fly-wheel 103 is at rest and only the satellites 104 rotate, driving the ring 101 slowly in the reverse direction.

By selecting one of the three possibilities it is therefore possible to adopt the kinetic energy value which is most suitable for each kind of work.

In the version according to FIG. 11, the use of the brushes 113, 114 and of the rings 115, 116 has been avoided. The magnetic circuit is closed by a part 119 fixed in the casing and an assembly conducting the magnetic lines of force composed of the core of fly-wheel 103 itself, and a ring 120 of soft iron insulated from the core 103 by another ring 121 of non-magnetic material, such as bronze or brass. This magnetic circuit acts on the yoke 122 of the ring, as in FIG. 10.

I claim:

1. A machine tool comprising:
a rotatable spindle having means for receiving a tool therein,
flywheel means,
first roller means carried by said spindle,
further roller means adapted for rolling engagement with said first roller means to be rotated thereby, said flywheel means coupled to said further roller means to be rotated as said further roller means is rotated,
and selectively operable means for engaging and disengaging the first roller means from said further roller means to thereby selectively provide and remove power from said flywheel means.

2. A machine tool according to claim 1 further comprising a shaft on which said flywheel means is mounted, wherein said further roller means comprises a roller mounted on said shaft, said selectively operable means for engaging and disengaging said further roller means from said first roller means comprising an eccentric bushing in which said shaft is mounted.

3. A machine tool according to claim 2 further comprising a machine casing, a pair of side members, articulated means connecting said side members to said casing located on either side of said further roller means, said eccentric bushing being mounted in said side members.

4. A machine tool as in claim 1 further comprising a planetary ring, said first roller means comprising a set of satellite rollers adapted for rolling with respect to said planetary ring and for rolling engagement with said further roller means, said selectively operable means comprising means for braking said planetary ring to cause said satellite rollers to drive said further roller means.

5. A machine tool as in claim 4 further comprising means for selectively coupling the planetary ring and said flywheel means to rotate together.

6. A machine tool according to claim 4 wherein said selective coupling means comprises magnetic circuit means carried by said flywheel means, said planetary ring including means forming a yoke for said magnetic circuit means, whereby when said magnetic circuit means is energized, said yoke contacts said magnetic circuit means and said planetary ring is fixed relative to the flywheel.

7. A machine tool according to claim 6, comprising a brush assembly, a pair of rings mounted on said flywheel means, said brush assembly contacting said rings, said magnetic circuit means comprising a winding arranged in said flywheel electrically connected to said rings, whereby an electric circuit is supplied to said winding from said brush assembly.

8. A machine tool according to claim 4 wherein said further roller means, said satellite rollers and said planetary ring have parallel axes and wherein said braking means comprises a pair of movable flanges engageable with said planetary ring.

9. A machine tool according to claim 4 wherein said satellite rollers are frusto-conical and said planetary ring is movable parallel to the axis of said spindle between a position in which said planetary ring contacts said satellite rollers and a position in which said ring is disengaged from said satellite rollers.

10. A machine tool according to claim 4 wherein said braking means comprises magnetic circuit means fixedly mounted with respect to said tool, said planetary ring including means forming a yoke for said magnetic circuit means, whereby when said magnetic circuit means is energized, said yoke contacts said magnetic circuit means and the planetary ring is prevented from rotating.

* * * * *